United States Patent
Hayashi et al.

(10) Patent No.: US 6,209,699 B1
(45) Date of Patent: Apr. 3, 2001

(54) ELECTROMAGNETIC CLUTCH

(75) Inventors: Toshihiro Hayashi, Chiryu; Yasuo Tabuchi, Toyoake; Masashi Tobayama, Chiryu, all of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/400,310

(22) Filed: Sep. 21, 1999

(30) Foreign Application Priority Data

Sep. 22, 1998 (JP) .................................................. 10-268517
Mar. 11, 1999 (JP) .................................................. 11-065341

(51) Int. Cl.[7] ................................................. F16D 27/112
(52) U.S. Cl. ..................... 192/84.941; 192/30 V; 192/84.961; 192/200
(58) Field of Search ........................... 192/84.94, 84.941, 192/84.96, 84.961, 30 V, 200

(56) References Cited

U.S. PATENT DOCUMENTS

| 2,407,757 | * | 9/1946 | MacCallum | 192/84.94 |
| 3,455,421 | * | 7/1969 | Miller | 192/84.961 |
| 4,187,939 | * | 2/1980 | Silvestrini et al. | 192/84.961 X |
| 5,377,799 | | 1/1995 | Mullaney | |
| 5,642,798 | * | 7/1997 | Muirhead et al. | 192/84.961 |
| 5,944,158 | * | 8/1999 | Okazaki | 192/84.961 X |

FOREIGN PATENT DOCUMENTS

| 49-132357 | 11/1974 | (JP) . |
| 60-138035 | 9/1985 | (JP) . |
| 61-194831 | 12/1986 | (JP) . |
| 6-159394 | 6/1994 | (JP) . |
| 8-121503 | 5/1996 | (JP) . |

* cited by examiner

Primary Examiner—Rodney H. Bonck
(74) Attorney, Agent, or Firm—Pillsbury Winthrop LLP

(57) ABSTRACT

A spring plate member is connected to a hub. The spring plate member includes a plate spring portion generating a resilient force to separate an armature from a rotor, and an outer ring portion, which faces the armature. An elastic member is provided between the armature and the outer ring portion for connecting the armature directly with the outer ring portion. Thus, operation noises of the electromagnetic clutch and a compressor are efficiently reduced. Further, the axial dimension of elastic member can be made much smaller than that of the conventional cylindrical elastic member.

8 Claims, 16 Drawing Sheets

FIG. 5A
FIG. 5B
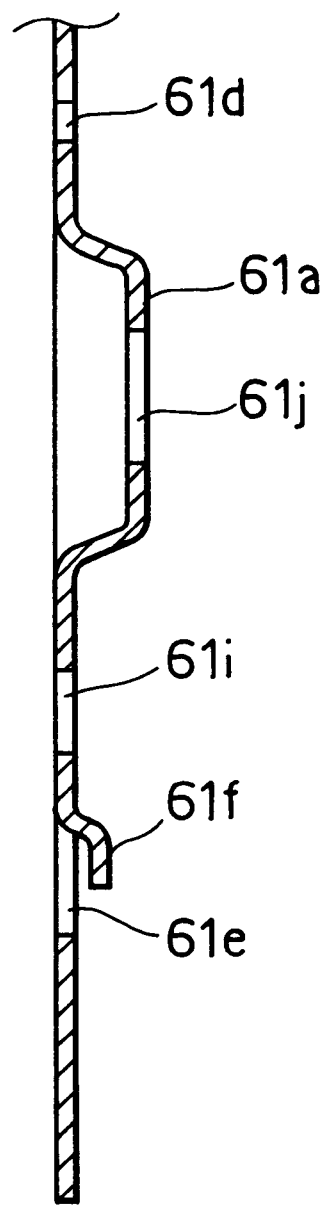
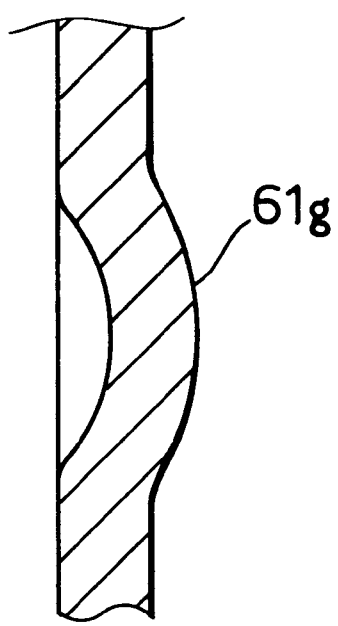

FIG. 15
FIG. 16
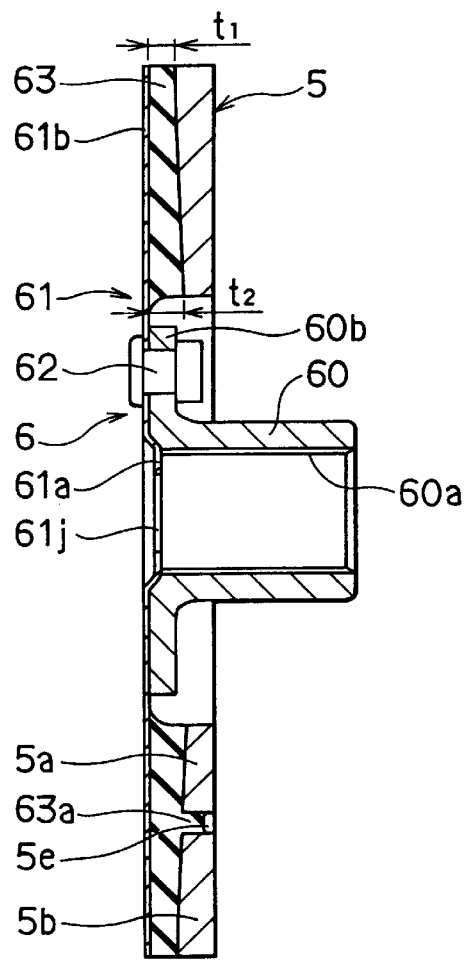
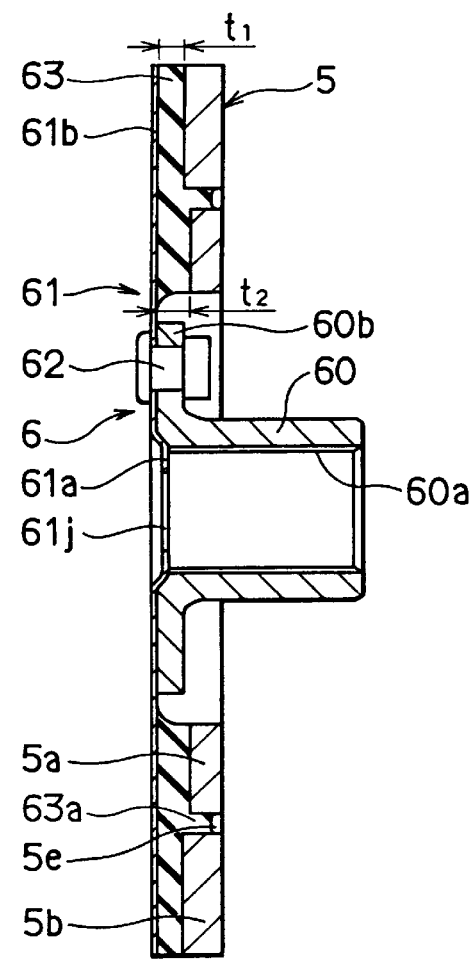

FIG. 18
FIG. 19
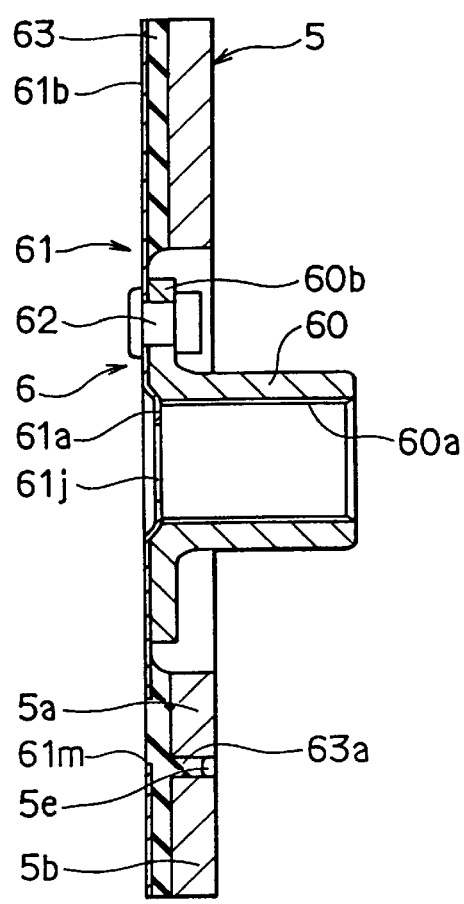
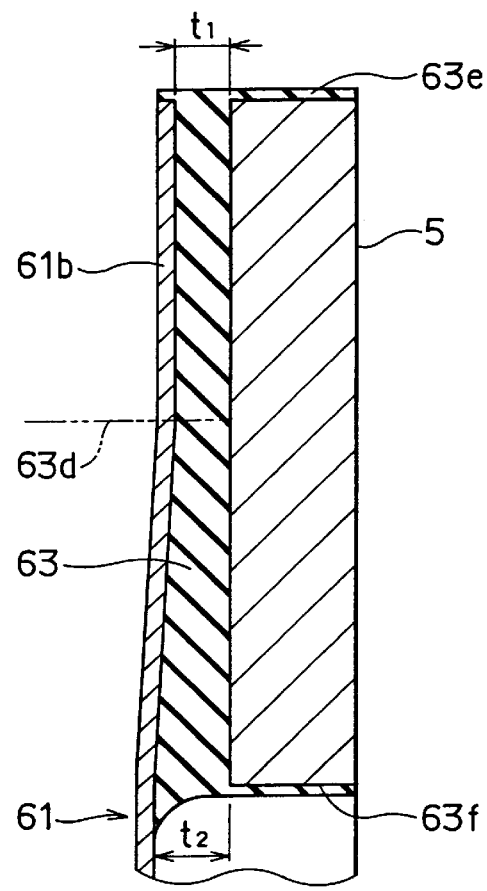

ELECTROMAGNETIC CLUTCH

CROSS REFERENCE TO RELATED APPLICATION

This application is based on and incorporates herein by reference Japanese Patent Application Nos. Hei. 10-268517 filed on Sep. 22, 1998 and Hei. 11-65341 filed on Mar. 11 1999.

BACKGROUND OF THE INVENTION

1. Field of the Invention

The present invention relates to an electromagnetic clutch suitable for use in a compressor of an automotive air conditioning system.

2. Description of Related Art

An electromagnetic clutch used for a compressor of an automotive air conditioner includes a rotor and an armature. The rotor rotates by receiving a rotational force from a vehicle engine, and the armature is placed to face the rotor with a predetermined slight gap. The armature is connected to a compressor shaft through a hub. In general, there are two types of hub constructions.

In a plate spring type hub construction, one end of the plate spring is connected to an inner hub mounted on the compressor shaft, and another end of the plate spring is connected to the armature.

In a rubber type hub construction, an inner area of a disk-shaped elastic member made of rubber is connected to an inner hub mounted on the compressor shaft, and an outer area is connected to the armature through a cylindrical support plate.

The plate spring type hub construction has no damping mechanism to reduce vibration and torque pulsation from the armature to the hub. Thus, clutch operation noise and torsional resonance of the clutch are not reduced.

In the rubber type hub construction, the resiliency of the elastic member must be sufficient to separate the armature from a friction surface of the rotor when an electromagnet is deenergized. Therefore, the axial dimension of the disk-shaped elastic member must be larger than that of the plate spring arrangement. As a result, the axial dimension of the clutch is enlarged.

JP-U-61-194831 discloses an electromagnetic clutch in which a plate-like elastic member and a rigid plate are provided to position an armature opposite to a rotor. The armature, the plate-like elastic member and the rigid plate are adhesively connected to each other, and the rigid plate is connected to an inner hub through plural plate springs. That is, a collision noise when the armature is coupled to the rotor is reduced by the damping function of the elastic member.

However, in this prior art, the rigid plate supporting the plate-like elastic member is connected to the inner hub by plural separated plate springs, thereby increasing the number of parts and manufacturing cost.

SUMMARY OF THE INVENTION

An object of the present invention is to provide an electromagnetic clutch having a simple structure, and having the advantages of both the plate spring type hub and the rubber type hub.

According to a first aspect of the present invention, a spring plate member is connected to a hub. The spring plate member includes an arm-like plate spring portion generating a resilient force to separate an armature from a rotor, and an outer ring portion integrally formed with the plate spring portion. Here, the outer ring portion faces the armature. An elastic member is provided between the armature and the outer ring portion for connecting the armature directly with the outer ring portion.

Thus, shock and vibration when the armature is coupled to the rotor are reduced by the elastic member. Similarly, torsional resonance caused by the torque vibration of the compressor is reduced. Therefore, operation noise of the electromagnetic clutch is efficiently reduced.

Further, when the clutch is disengaged, the armature is returned to its original position by the resilient force of the plate spring portion, thus the elastic member need not return the armature. Therefore, the elastic member can be formed as a thin plate along the radial direction of the armature and the outer ring portion. Thus, the axial dimension of elastic member can be made much smaller than that of conventional clutch having a rubber type hub.

Further, even when a rotation apparatus operated by the clutch is locked, the elastic member can melt by the heat generated by friction from the armature rubbing against the rotor. This causes the spring plate member to disconnect from the armature. That is, the elastic member works to limit torque transmission. Therefore, an excessive load condition caused by the lock of the rotation apparatus is stopped. Accordingly, a V-belt driving the rotor is not damaged and the temperature of the friction surface does not significantly increase, as would happen if the excessive load condition continued for a long time.

Additionally, the armature is directly supported by the elastic member, and the outer ring portion is integrated with the arm-like plate spring portion. Thus, the structure is much more simple in comparison with that in JP-U-61-194831, and easily assembled, thereby reducing the manufacturing cost.

According to second aspect of the present invention, a spring plate member is connected to a hub, and the spring plate member includes an arm-like plate spring portion generating a resilient force to separate an armature from a rotor. A separate outer ring portion is connected to the spring plate member and faces the armature. A radially outer portion of the arm-like plate spring portion is connected to the outer ring portion. Further, an elastic member is provided between the armature and the outer ring portion for connecting the armature directly with the outer ring portion.

Thus, the elastic member is attached to the outer ring portion and the armature while the outer ring portion is separate from the spring plate member, thereby simplifying the attachment process. Further, the outer ring portion and the spring plate member are formed independently, thus shapes of these elements can be simplified.

According to third aspect of the present invention, a spring plate member is connected to a hub. The spring plate member includes a saucer-like plate spring portion generating a resilient force to separate an armature from a rotor. An elastic member is provided between the armature and the saucer-like plate spring portion for connecting the armature directly with the saucer-like plate spring portion.

Thus, the plate spring portion is completed disk, thereby reducing the manufacturing cost of the spring plate member. As a result, an electromagnetic clutch having same effect of the first aspect of the present invention can be provided with a small cost.

BRIEF DESCRIPTION OF THE DRAWINGS

Additional objects and advantages of the present invention will be more readily apparent from the following detailed description of preferred embodiments thereof when taken together with the accompany drawings in which:

FIG. 5A is a cross-sectional view taken along line VA—VA in FIG. 4;

FIG. 5B is enlarged view of a support rib in FIG. 5A;

Figure 7:
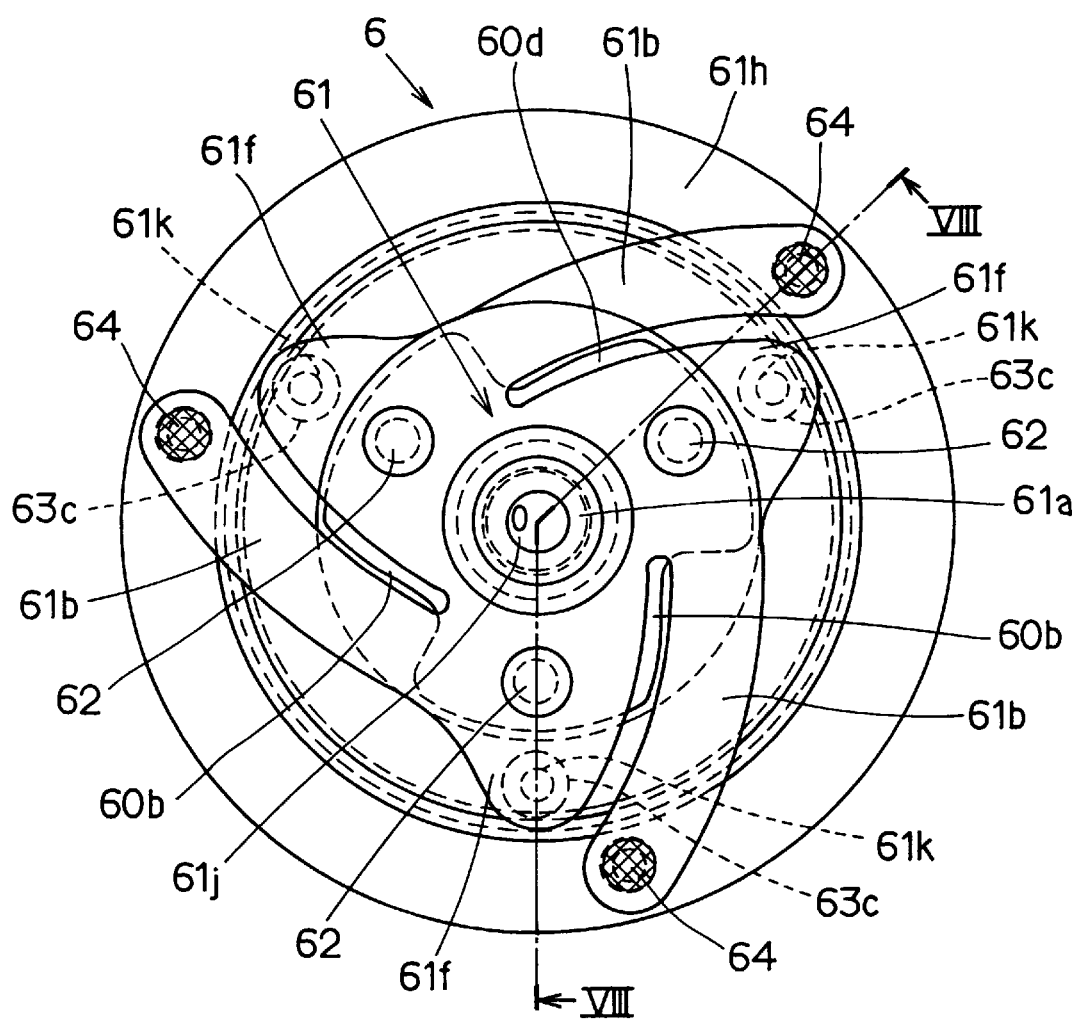
Figure 8:
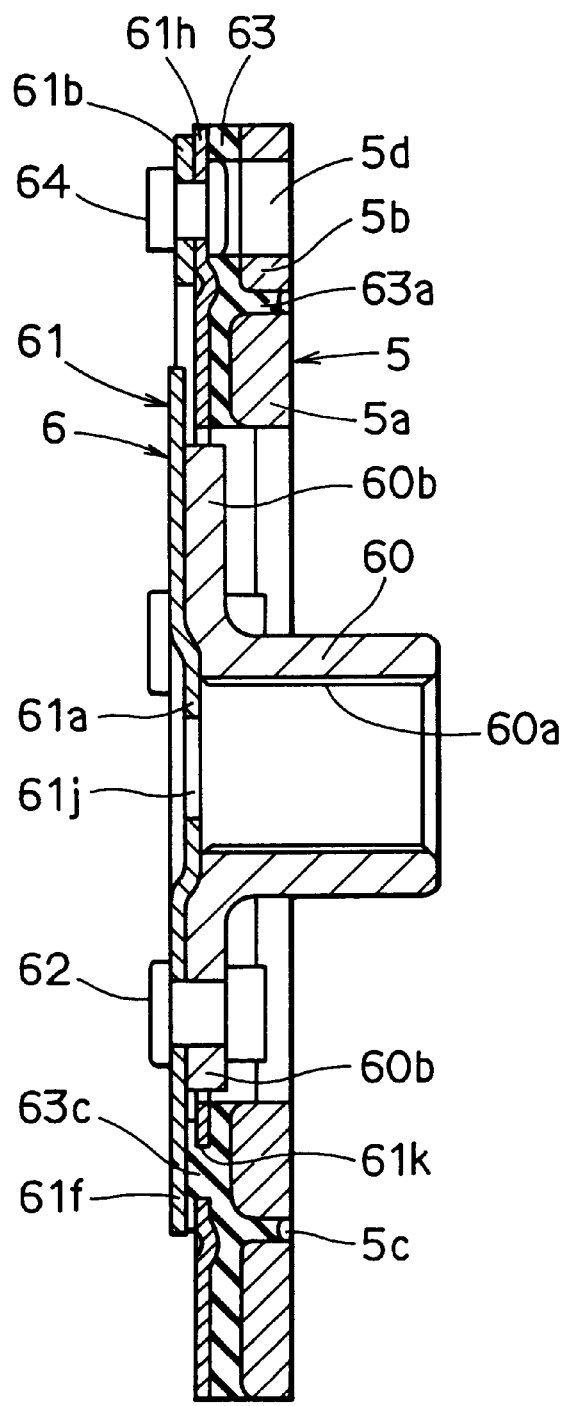
Figure 9:
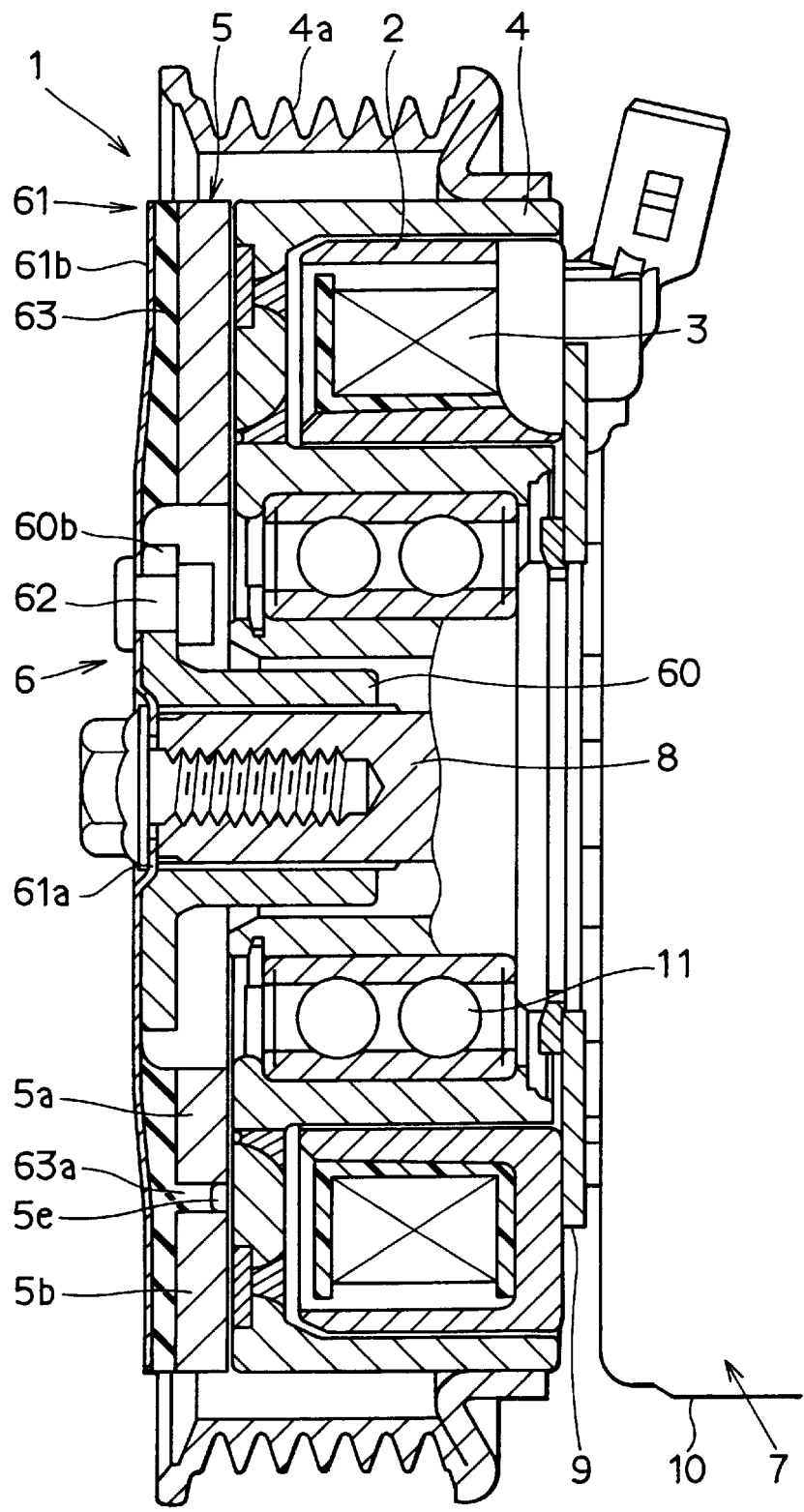
Figure 10:
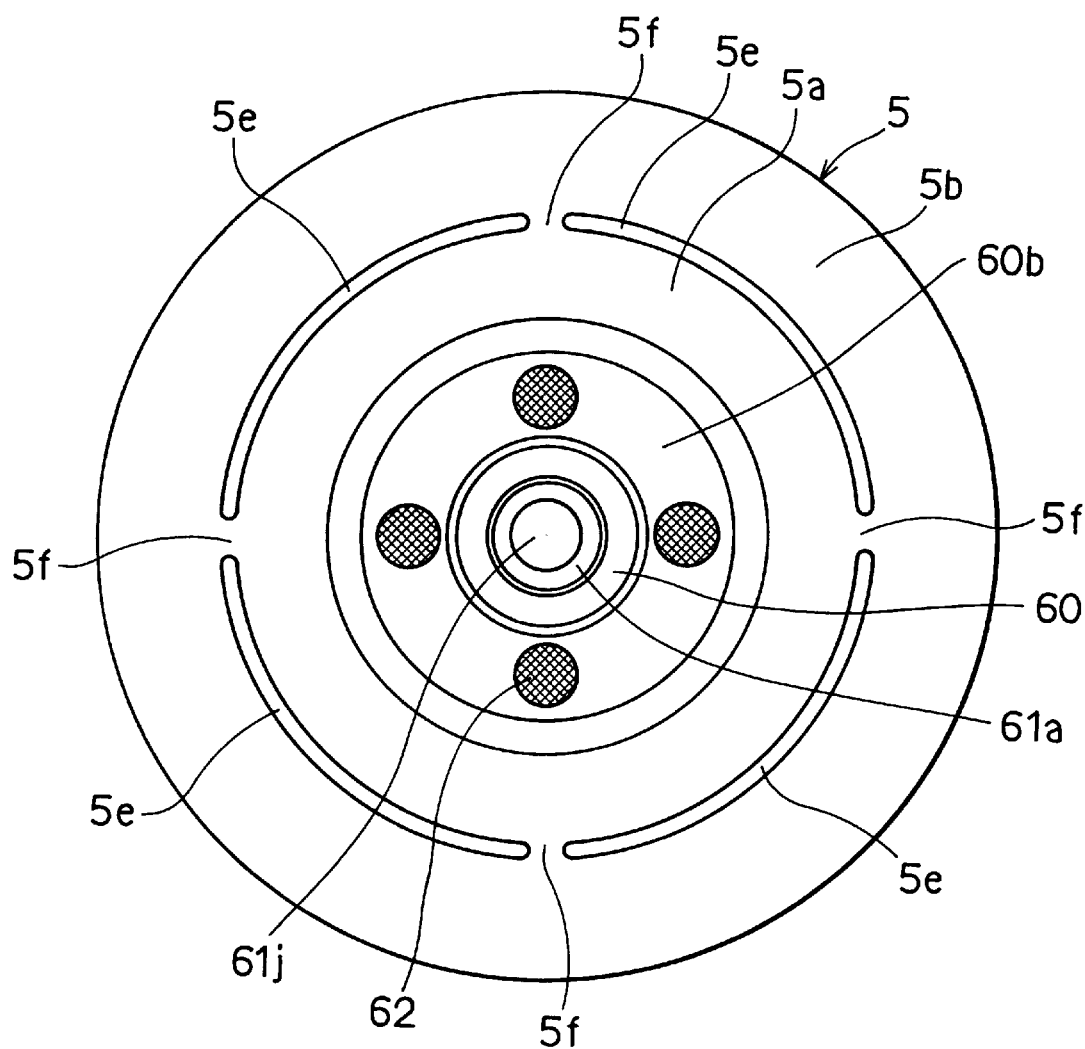
Figure 11:
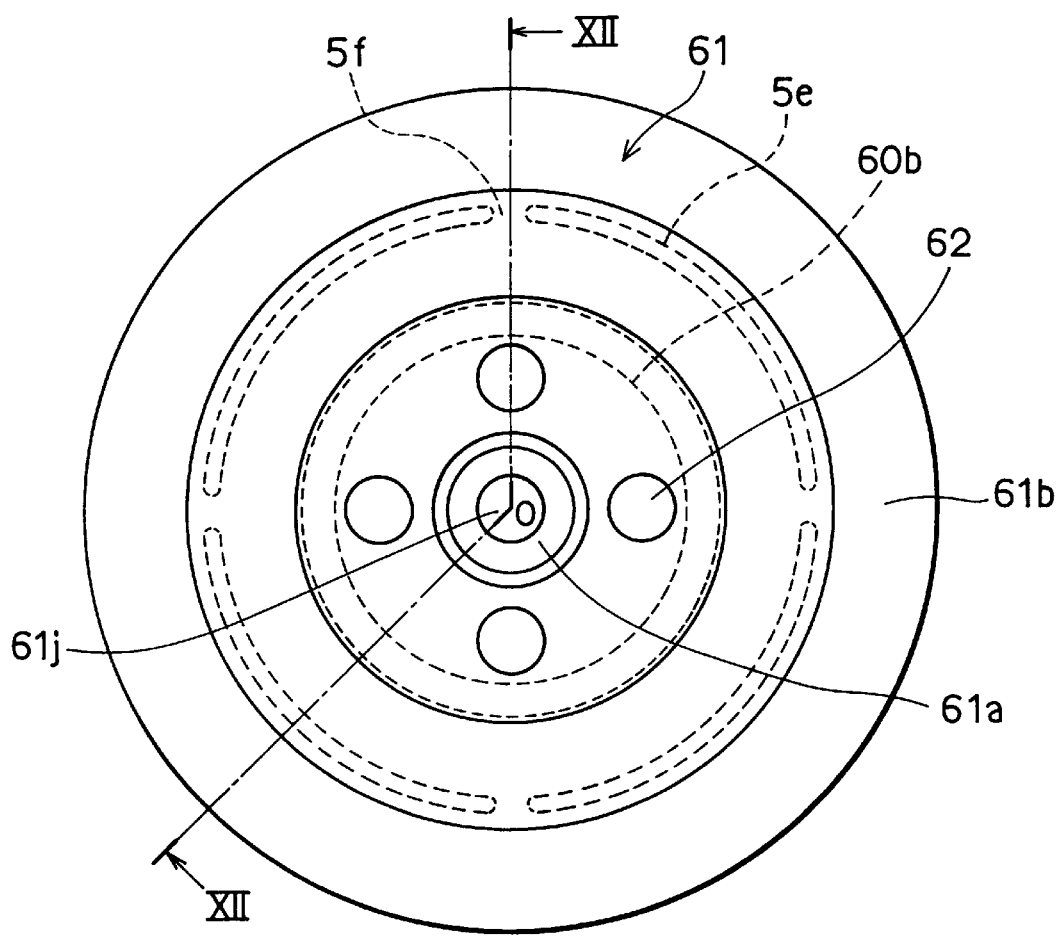
Figure 12:
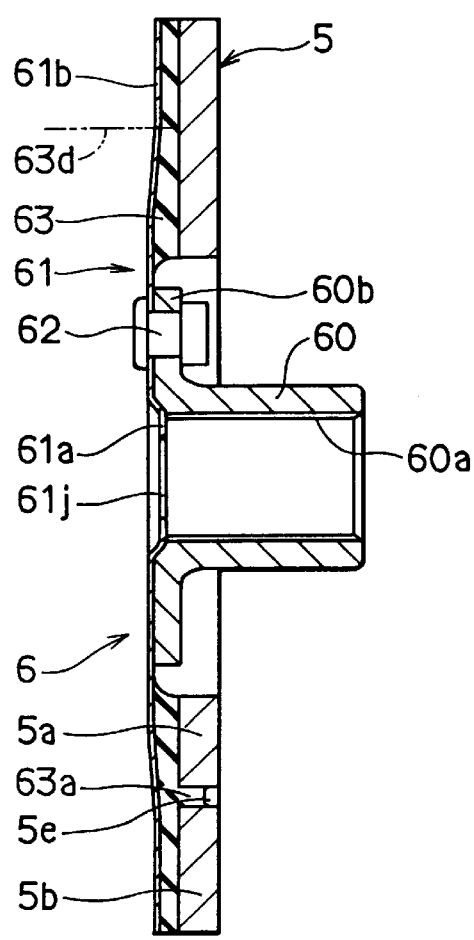
Figure 14:
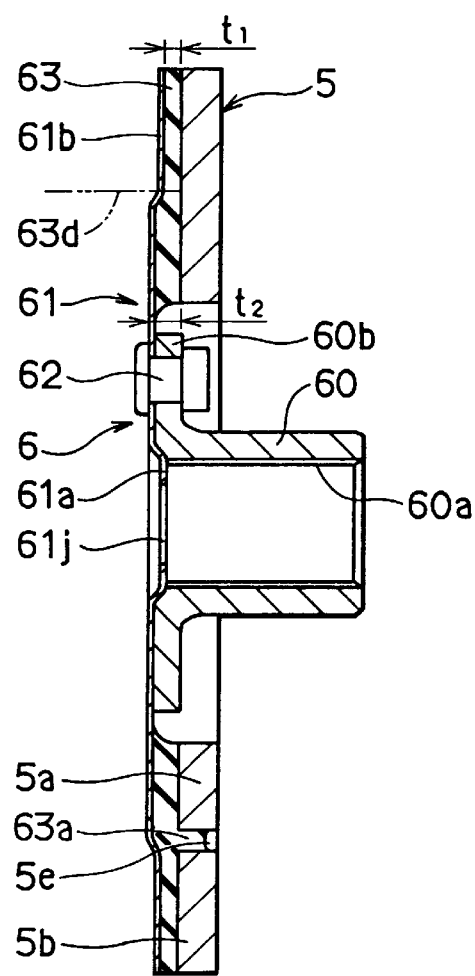
Figure 13:
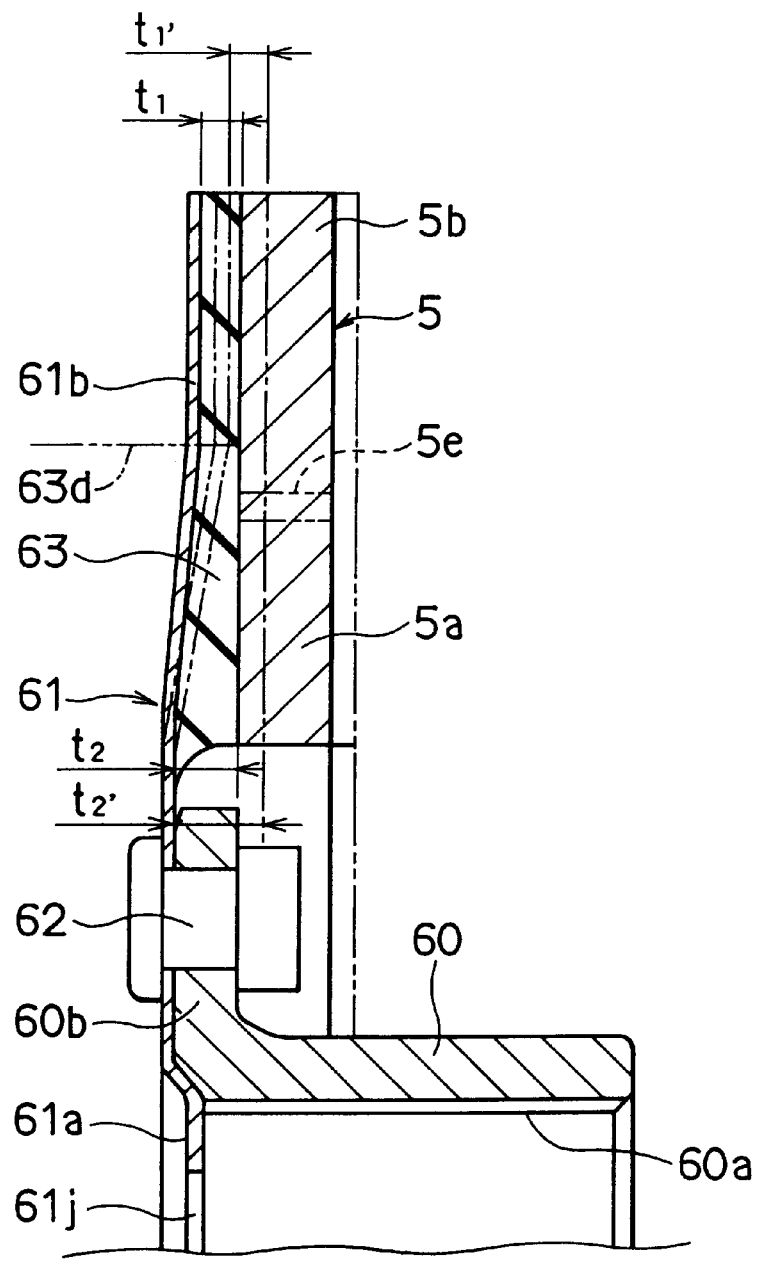
Figure 17:
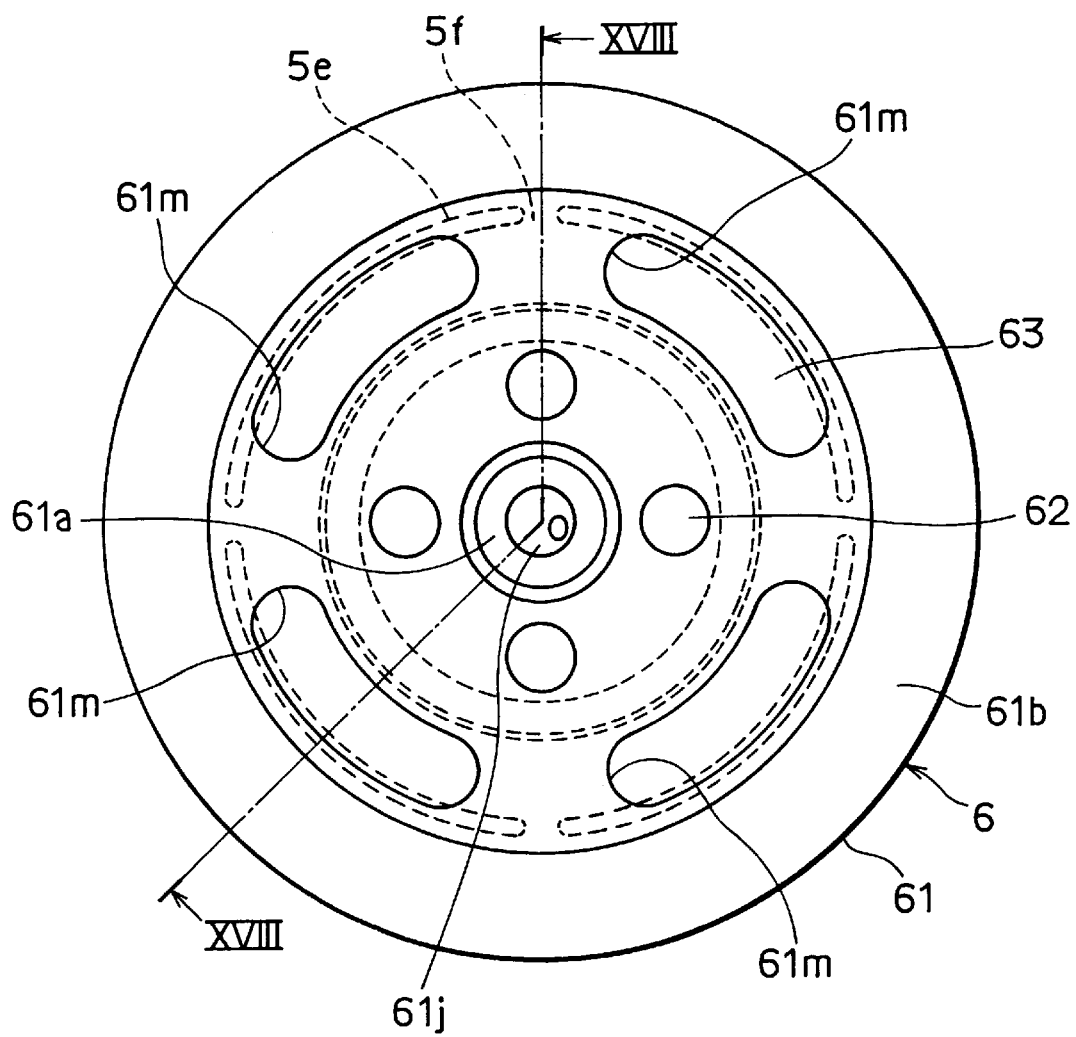

FIG. a front view of the spring plate member for explaining an attachment area of an elastic member;

FIG. 7 is a front view showing a hub of an electromagnetic clutch (second odiment);

FIG. 8 is a cross-sectional view taken along line VIII—VIII in FIG. 7;

FIG. 9 is a cross-sectional view showing an electromagnetic clutch (third embodiment);

FIG. 10 is a back view showing a hub from an armature side (third embodiment);

FIG. 11 is a front view showing the hub from a spring plate member side (third embodiment);

FIG. 12 is a cross-sectional view taken along line XII—XII in FIG. 11;

FIG. 13 is a artial enlarged view of FIG. 12;

FIG. 14 is a cross-sectional view showing a hub of an electromagnetic clutch (fourth embodiment);

FIG. 15 is a cross-sectional view showing a hub of an electromagnetic clutch (fifth embodiment);

FIG. 16 is a cross-sectional view showing a hub of an electromagnetic clutch (sixth embodiment);

FIG. 17 is a cross-sectional view showing a hub of an electromagnetic clutch (seventh embodiment);

FIG. 18 is a cross-sectional view taken along line XVIII—XVIII in FIG. 17, and

FIG. 19 is a cross-sectional view showing a hub of an electromagnetic clutch (eighth embodiment).

DETAILED DESCRIPTION OF PREFERRED EMBODIMENTS (First Embodiment)

Figure 1:
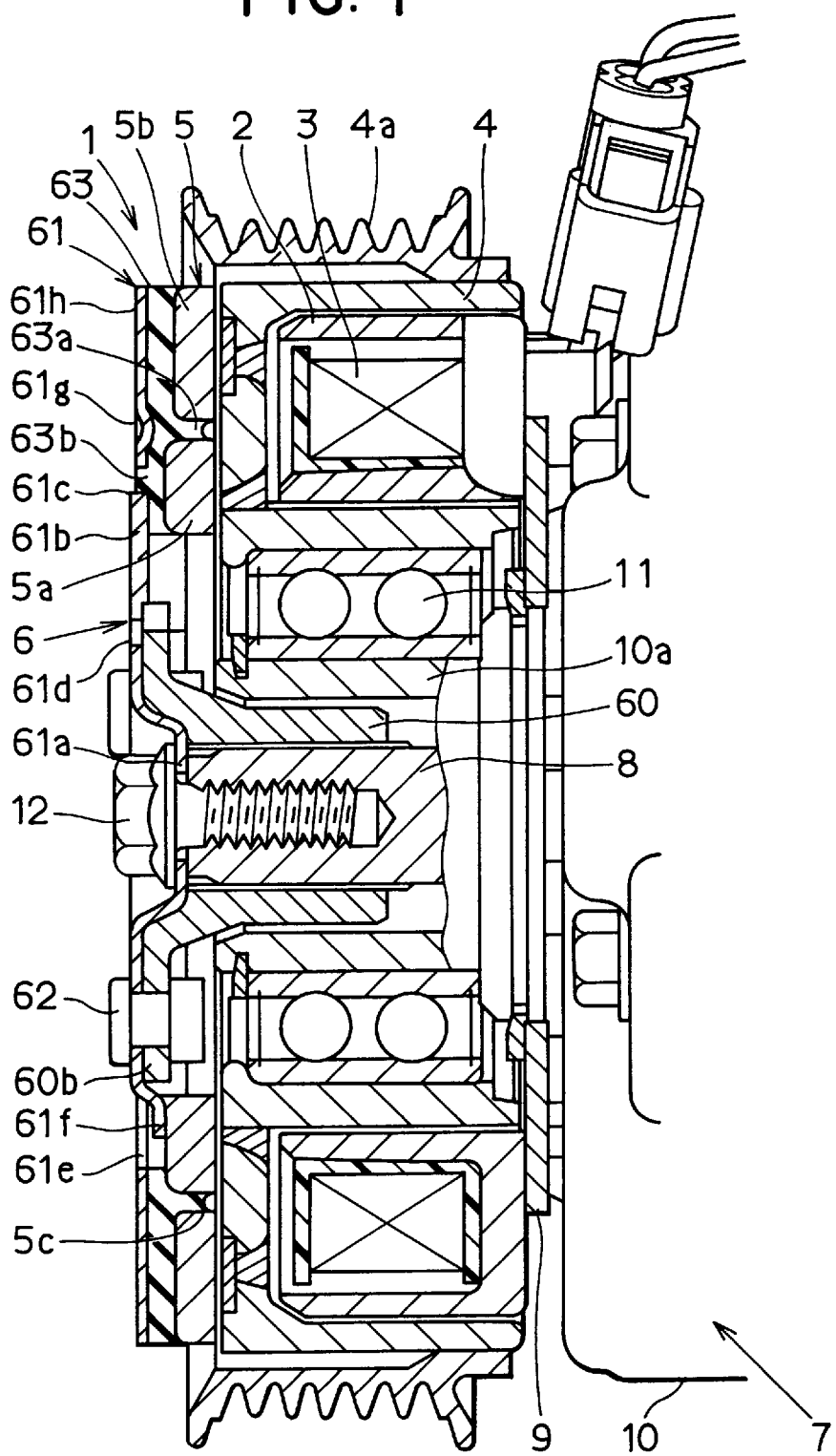
FIG. 1 is a cross-sectional view showing an electromagnetic clutch (first embodiment)

In the first embodiment, an electromagnetic clutch 1 is attached to a refrigerant compressor 7 of an automotive air conditioning system. FIG. 1 shows a cross-sectional view of the electromagnetic clutch 1.

The electromagnetic clutch 1 includes a stator 2, an electromagnetic coil 3, a rotor 4, an armature 5, and a hub 6. The electromagnetic coil 3 is installed in the stator 2. The stator 2 is made of magnetic material such as iron, and formed into a cross-sectional U-shape. The rotor 4 rotates by receiving a rotational force from a vehicle engine (not illustrated). The armature 5 is coupled to the rotor 4 by an electromagnetic force generated in the electromagnetic coil 3. The hub 6 is connected with the armature 5 and rotates therewith.

The hub 6 is connected to a rotational shaft 8 of a refrigerant compressor 7, and transmits a rotation force to the compressor 7.

The electromagnetic coil 3 is installed in the stator 2, and mold-fixed therein by insulating resin such as epoxy. The stator 2 is fixed in the housing 10 of the compressor 7 through a ring-shaped supporter 9.

The rotor 4 includes a pulley 4a around which a multi-stage V-belt (not illustrated) is wrapped, and rotates by receiving a rotational force from the vehicle engine through the V-belt. The rotor 4 is made of magnetic material such as iron, and is formed into a cross-sectional U-shape and is installed over the stator 2 with a slight gap therebetween. A bearing 11 is inserted into the inner periphery of the rotor 4. The rotor 4 is rotatably supported on a columnar boss portion 10a of the compressor housing 10 through the bearing 11.

The armature 5 is placed opposite to a friction face of the rotor 4 with a predetermined slight gap (for example, 0.5 mm). The armature 5 is made of magnetic material such as iron and formed into a ring-like shape. The armature 5 of the present embodiment includes an inner ring 5a and an outer ring 5b. The outer ring 5b is placed at the outer periphery of the inner ring 5a with a predetermined gap 5c to interrupt a magnetic circuit.

The hub 6 includes a cylinder shaped inner hub 60 made of iron. A spline connection portion 60a (see FIG. 3) is formed at a cylindrical inner surface of the inner hub 60. The inner hub 60 is connected to the shaft 8 through the spline connection portion 60a. Further, the inner hub 60 integrally includes three flanges 60b extending radially outwardly from the axial end thereof. These three flanges 60b are, as shown in FIG. 2, formed at equal intervals circumferentially and protrude outwardly like substantially rectangular shaped plates.

Figure 4:
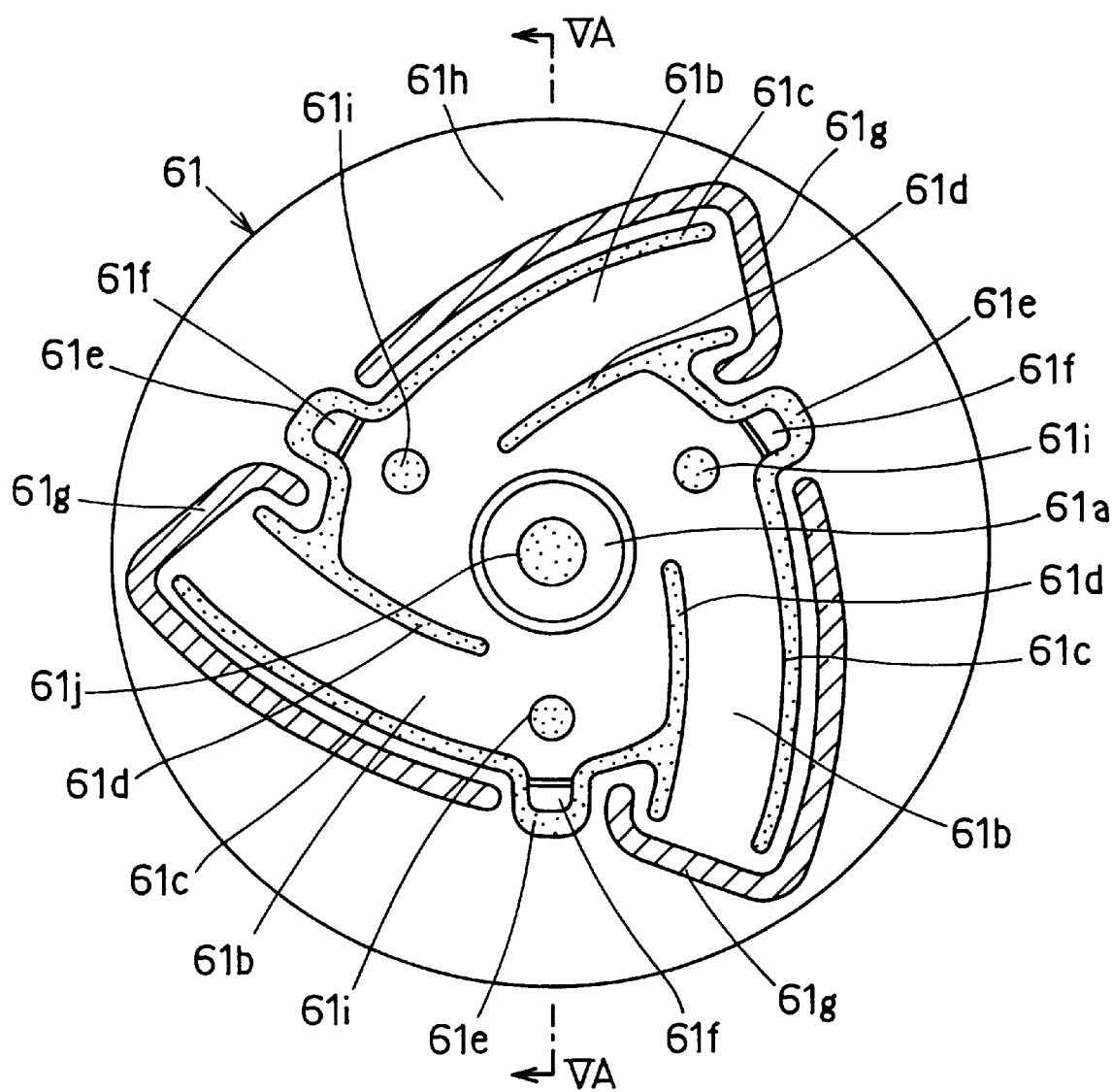
FIG. 4 a front view showing a spring plate member provided in the hub.
Figure 6:
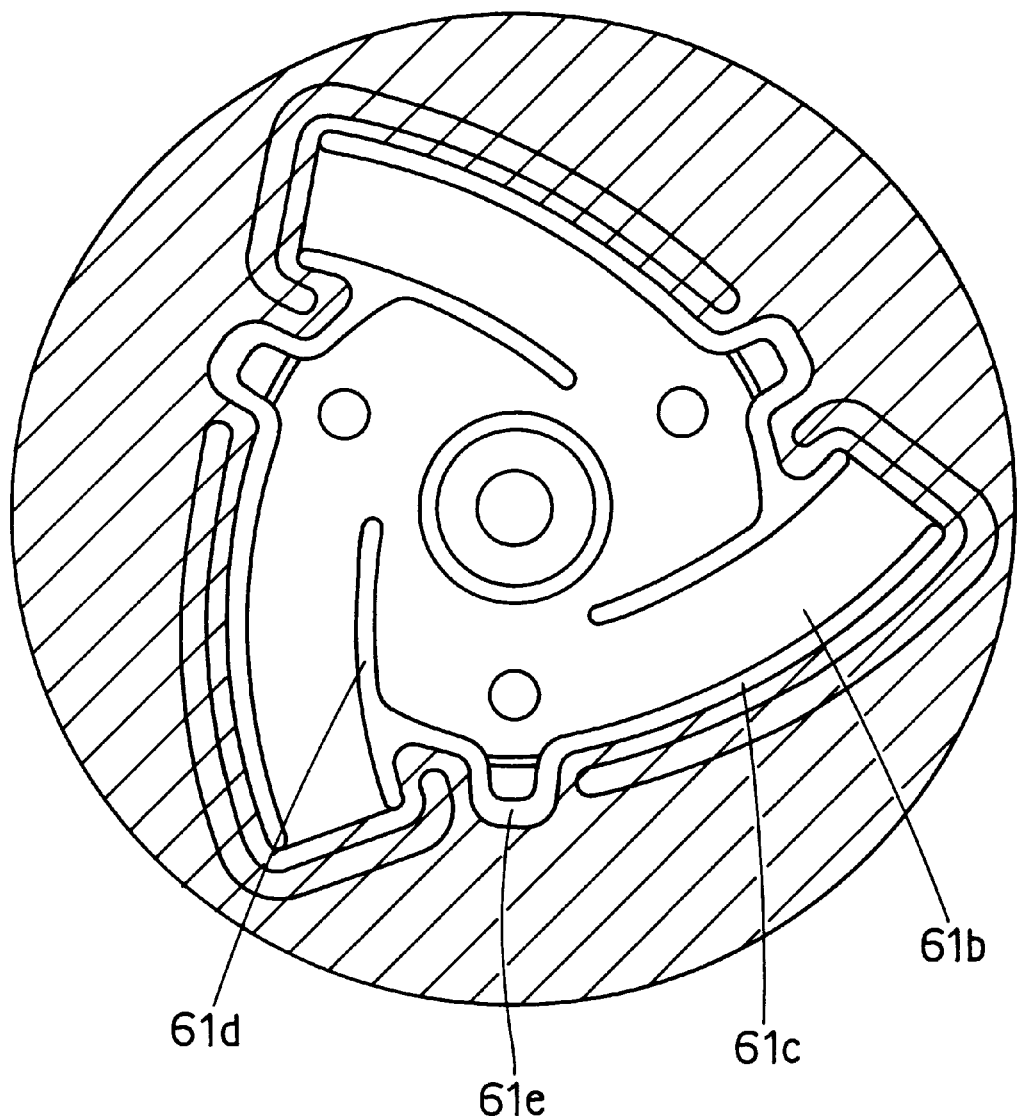

A spring plate member 61 is, at the inner area thereof, connected to the flanges 60b by three rivets 62. The spring plate member 61 is made of iron-series metal elastic material and formed into a disc shape as shown in FIGS. 4–6. In FIG. 4, for easily explaining the entire shape of the spring plate member 61, a thickness direction punched-through area of the spring plate member 61 is drawn by dotted area, and a punch-deformed area thereof is drawn by slant line area.

The spring plate member 61 includes a first ring-like stopper 61a formed at the most inner periphery thereof, which protrude further inwardly from a cylindrical inner surface of the inner hub 60. The first stopper 61a is inserted between a front end surface of the shaft 8 and a head flange surface of a bolt 12, and fastened to the front end surface of the shaft 8 by the bolt 12. Thereby, the relative place of the hub 60 to the shaft 8 is fixed, and the hub 60 is integrally connected to the shaft 8.

Figure 2:
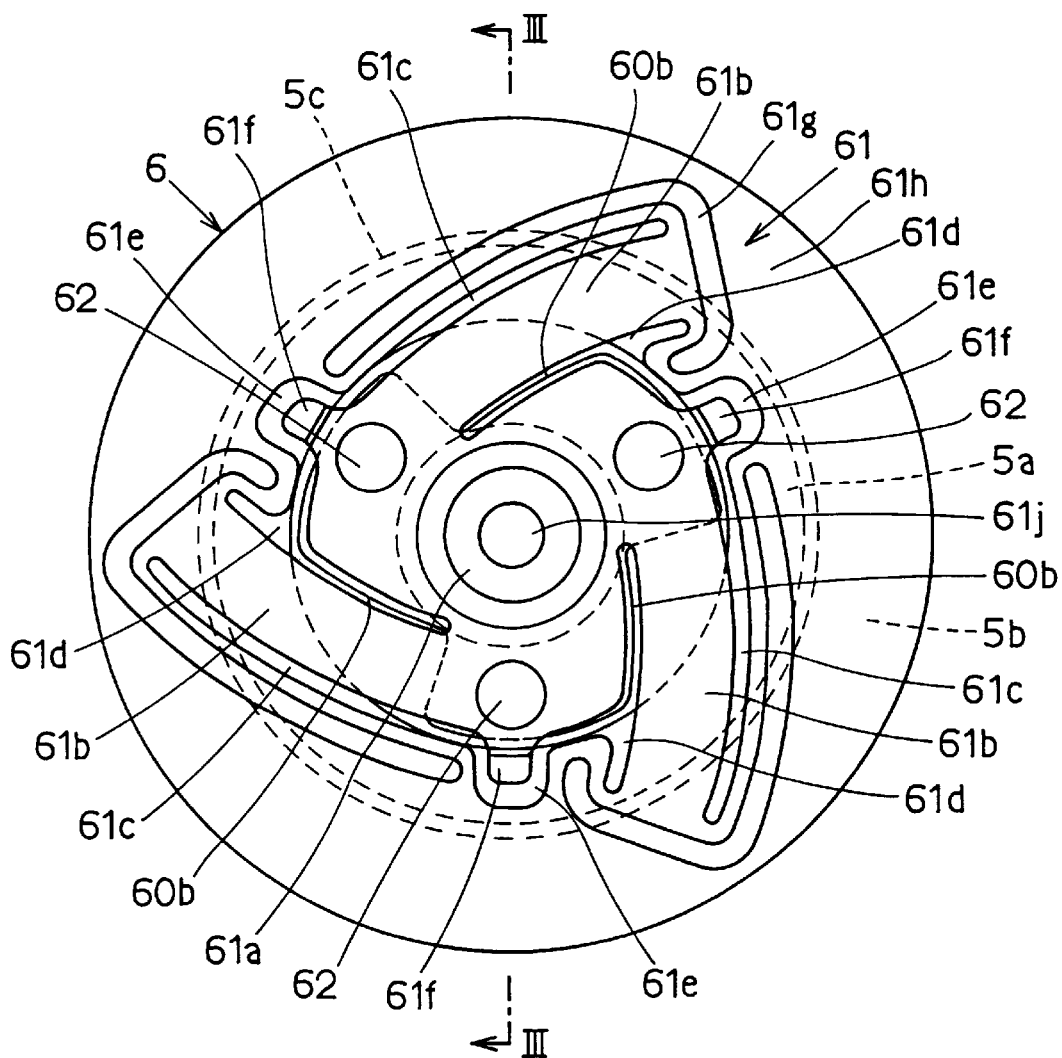
FIG. 2 is a front view showing a hub of the electromagnetic clutch (first embodiment)

Further, as shown in FIGS. 2 and 4, in the spring plate member 61, three thin arm-like plate spring portions 61b are formed from the rivet connection points. Each plate spring portion 61b extends diagonally outwardly like an arc. For forming the plate spring portion 61b, an outer groove 61c and an inner groove 61d are formed at the outer area and inner area of the plate spring portion 61b respectively. Here, the outer groove 61c of each plate spring portion 61b is connected to the inner groove 61d of each adjacent plate spring portion 61b through a gate-shaped intermediate groove 61e which extends outwardly. Both outer groove 61c and inner groove 61d extend completely through the spring plate member 61.

Figure 3:
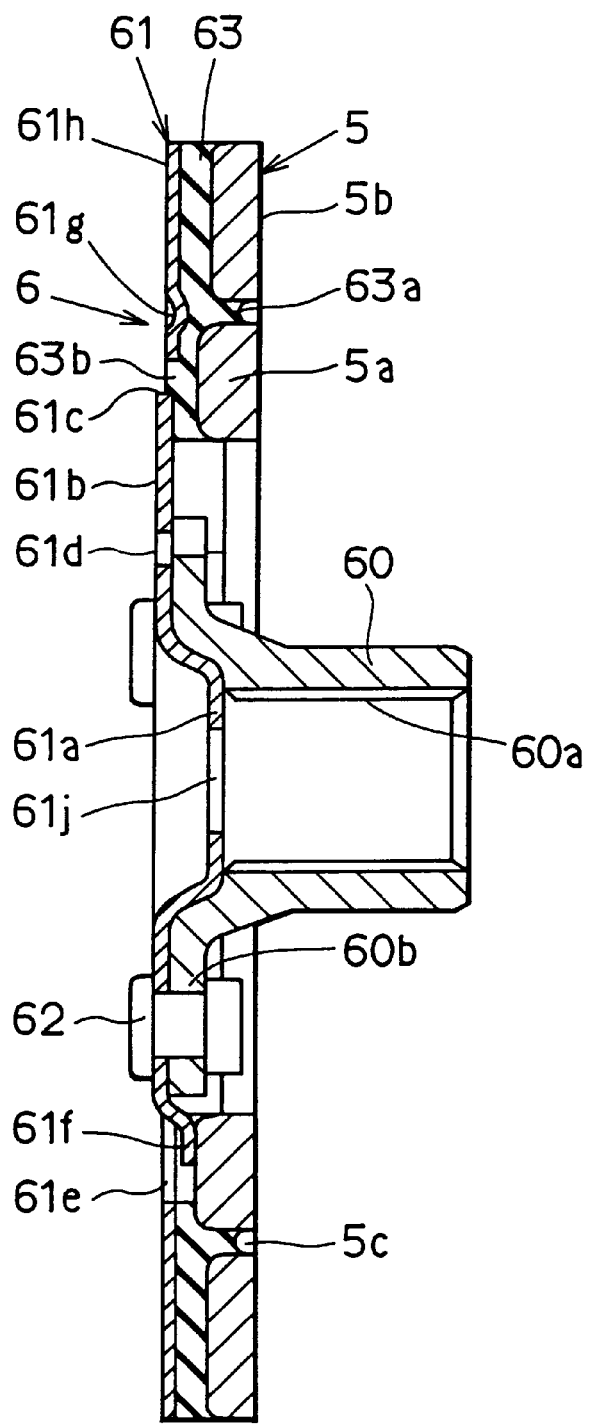
FIG. 3 is a cross-sectional view taken along line III—III in FIG. 2.

By forming the gate-shaped intermediate groove 61e, a convex-like second stopper 61f is formed in the spring plate member 61. As with grooves 61c and 61d, intermediate groove 61e extends completely through the spring plate 61. The second stopper 61f is, as shown in FIG. 2, located to abut on the outside of the rivet 62. As shown in FIG. 3, a front end of the second stopper 61f is axially bent toward the inner ring 5a of the armature 5. The front end of the second stopper 61f contacts with the inner ring 5a to push the armature 5 toward the friction surface of the rotor 4 in the axial direction.

An outer front end of the plate spring portion 61*b* is integrally connected to an outer ring portion 61*h* through a support rib 61*g*. Therefore, in the spring plate member 61, the most inner first stopper 61*a* through the outer ring portion 61*h* is is integrally formed as a single circular disc.

The support rib 61*g* is, as shown in FIG. 5B, a punch-deformed portion of the spring plate member 61, and suppresses the deformation of the outer ring portion 61*h* by increasing its rigidity. As shown by the slant line areas in FIG. 4, the support rib 61*g* is formed along the outer groove 61*c* toward the outer front end thereof, and is substantially bent in an L-shape at a front end point.

The outer ring portion 61*h* of the spring plate member 61 is, as shown in FIG. 3, formed to extend radially opposite to the armature 5. An elastic member 63 is provided between the outer ring portion 61*h* and the inner and outer rings 5*a*, 5*b* of armature 5 to connect them to each other.

The elastic member 63 is made of rubber elastic material, and, as shown in FIG. 3, formed into a ring-like plate corresponding to the ring shape of the armature 5. The elastic member 63 adheres to the outer ring portion 61*h* and the inner and outer rings 5*a* and 5*b*. A slant line area in FIG. 6 denotes the area where the elastic member 61 is attached to the spring plate member 61.

As shown in FIG. 3, with respect to the armature 5, the elastic member 63 is attached radially outward from the inner periphery of the inner ring 5*a*. While, as shown in FIG. 6, with respect to the spring plate member 61, the elastic member 63 is attached radially outward from the grooves 61*c*, 61*d* and 61*e*.

That is, the elastic material 63 is not attached to the plate spring portion 61*b* even where plate spring portion 61*b* is radially outward from the inner periphery of the inner ring 5*a*, so that the plate spring portion 61*b* can bend freely. When the elastic member 63 is being attached, the elastic member 63 is easily prevented from adhering to the plate spring portion 61*b* by masking the plate spring portion 61*b* to prevent application of adhesive. Further, when the elastic member 63 adheres to the spring plate member 61, convex portions 63*a* and 63*b* shown in FIG. 3 are automatically formed.

The rubber material of the elastic member 63 is preferably a material which efficiently transmits torque and absorbs torque vibration (damping vibration), such as butyl rubber chloride, acrylonitrile-butadiene rubber and ethylene propylene rubber.

In FIG. 4, a circular hole 61*i* is an insertion hole for the rivet 62, and a center hole 61*j* is an insertion hole for the bolt 12.

Next, the operation of this first embodiment will be explained. When an electric current is not supplied to the electromagnetic coil 3, the plate spring potion 61*b* retains the armature 5 to have a predetermined gap against the friction surface of rotor 4.

As shown in FIG. 3, the second stopper 61*f* is axially bent toward the inner ring 5*a* to contact the inner ring 5*a*, and simultaneously, the armature 5 is urged toward the friction surface of rotor 4. By this axial displacement of the armature 5, the plate spring portion 61*b* is elastically transformed toward the rotor 4 by a predetermined amount. As a result, the plate spring portion 61*b* has an urging force to retain the armature 5 apart from the friction surface of the rotor 4 by a predetermined gap, thereby retaining the armature 5 apart from the rotor 4 by a predetermined gap.

Here, the rotational force from the engine is transmitted to the rotor 4 only, through the V-belt, and is not transmitted to the armature 5 and the hub 6. Thus, the rotor 4 idles on the bearing 11, and the compressor 7 does not operate.

When the electric current is supplied to the electromagnetic coil 3, the electromagnetic force of the coil 3 attracts the armature 5 toward the rotor 4 against the spring force of the plate spring portion 61*b*, so that the armature 5 couples to the rotor 4. Thus, the rotation of the rotor 4 is transmitted to the shaft 8 of the compressor 7 through the armature 5, elastic member 63, spring plate member 61 and inner hub 60, then the compressor 7 operates.

After that, when the supply of electric current is stopped, the electromagnetic force is eliminated, and the armature 5 returns to the original position by the spring force of plate spring portion 61*b*, thereby stopping the operation of the compressor 7.

According to the present embodiment, because the elastic member 63 is provided between the armature 5 and the outer ring portion 61*h* of the spring plate member 61, shock and vibration at the time when the armature 5 connects with the rotor 4 are reduced. Similarly, the elastic member 63 reduces torsional resonance caused by the torque vibration of the compressor 7. Therefore, operation noise of the electromagnetic clutch 1 and the refrigerant compressor 7 are efficiently reduced.

Further, when the clutch 1 is disengaged, the armature 5 is returned to its original position by the resilient force of the plate spring portion 61*b*. Thus the elastic member 63 does not have to play a role in returning the armature 5 to its original position. Therefore, the elastic member 63 can be formed as a thin plate along the radial direction of the armature 5 and the outer ring portion 61*h*. For example, the axial dimension (thickness) of the elastic member 63 can be 2.0 mm. Thus, the axial dimension of elastic member 63 can be made much smaller than that of a conventional cylinder-like elastic member (usually, about 10 mm).

Further, even when the compressor 7 is locked, so that the hub 6 and the armature 5 connected with the shaft 8 of the compressor 7 cannot rotate, the rotor 4 rotates while sliding against the armature 5. As a result, a friction surface between the rotor 4 and the armature 5 becomes hot, and the temperature of elastic member 63 increases.

When the temperature of elastic member 63 increases to its melting point, the spring plate member 61 is disconnected with the armature 5. Therefore, the armature 5 couples with the rotor 4, and the rotor 4 rotates with the armature 5. That is, a torque transmission from the armature 5 to the spring plate member 61 is shut off. Thus an excessive load condition caused by the lock of compressor 7 is solved. Accordingly, the V-belt is not damaged and the temperature of the friction surface does not significantly increase, as would happen if the excessive load condition continued for a long time.

(Second Embodiment)

FIGS. 7 and 8 show a second embodiment. In the first embodiment, plate spring portions 61*b* and outer ring portion 61*h* are formed integrally. Alternatively, in the second embodiment, the outer ring portion 61*h* is formed as a separate portion from the spring plate member 61.

Therefore, according to the second embodiment, the elastic member 63 is adhesively attached to the outer ring portion 61*h* and the armature 5 with the outer ring portion 61*h* separated from the spring plate member 61. Thus, the attachment process becomes simple because the plate spring portion 61*b* needs not be masked from the adhesive.

In the second embodiment, the radially outer edge of plate spring portion 61*b* extends to the outer periphery of outer ring portion 61*h*. The radially outer portion of plate spring portion 61*b* is connected to the outer ring portion 61*h* by a rivet 64. Here, the outer portion of plate spring portion 61*b* is connected to the outer ring portion 61*h* after the elastic member 63 is provided. The outer ring 5*b* of armature 5 has a circular hole 5*d* having a same diameter as the head of rivet 62. The rivet 62 is inserted into the circular hole 5*d* and a head is formed.

As shown in FIG. 8, an inner diameter of the outer ring portion 61*h* is equal to that of the inner ring 5*a*. The outer ring portion 61*h* has three circular holes 61*k* abutting on the inner periphery thereof, which are formed at equal circumferential intervals. A projection 63*c* of the elastic member 63 protrudes outside (left side in FIG. 8) through the circular hole 61*k*. The head of the projection 63*c* expands like a clip at an outside of the outer ring portion 61*h*.

As shown in FIG. 7, in the plate spring member 61, the second stopper 61*f* extends radially outward between adjacent plate spring portions 61*b*. The second stopper 61*f* pushes the armature 5 toward the rotor 4 through the projection 63*c*. Thus the plate spring portion 61*b* is elastically deformed.

According to the second embodiment, when the armature 5 returns away from the rotor 4 to its original position, the clip-like head of the projection 63*c* elastically collides with the second stopper 61*f*, thereby reducing clutch operation noise when the clutch 1 is turned off.

In the second embodiment, the projection 63*c* of the elastic member 63 need not be provided. Alternatively, the second stopper 61*f* may be bent toward the armature 5 as in the first embodiment to push the armature 5 toward the rotor 4.

(Third Embodiment)

According to the third embodiment, as shown in FIGS. 9—13, in the spring plate member 61, an entire disc facing the armature 5 works as the plate spring portion 61*b*. Therefore, the plate spring portion 61*b* works as a saucer-like spring.

Here, the construction of hub 6 will be explained in more detail. As shown in FIGS. 12 and 13, the disk-like spring plate member 61 includes a first stopper 61*a* and a central hole 61*j* as in the first and second embodiments. The spring plate member 61 is connected to the flange 60*b* of the inner hub 60 by a rivet 62 radially outward from the first stopper 61*a*.

In the spring plate member 61, the plate spring portion 61*b* is an entire disc extending to the rivet to form a saucerlike spring. The elastic member 63 is attached to the entire surface of the plate spring portion 61*b*, and connects the plate spring portion 61*b* to a back surface of the armature 5 which is opposite to the friction surface. Here, the outer thickness (axial direction size) t1 of elastic member 63 is set smaller than the inner thickness t2 thereof. For example, the outer thickness t1 is 2 mm, and the inner thickness t2 is 3 mm.

The inner thickness t2 of elastic member 63 gradually decreases from the center through the intermediate portion 63*d*, and the outer thickness t1 is constant from the intermediate portion 63*d* through the outer periphery thereof. Because the thickness of armature 5 is constant, the spring plate member 61 is press-formed in such a manner that the outer area of plate spring portion 61*b* is curved toward the armature 5 along an inclination of the elastic member 63.

Here, the plate spring portion 61*b* is a saucer-like spring the spring modulus of which is large, the plate spring portion 61*b* need not be distorted to attain a static resilient force.

Further, in the third embodiment, as shown in FIG. 10, the armature 5 is formed as a single ring. That is, the armature 5 has four arc-like slots 5*e* extending completely through armature 5, between an inner portion 5*a* and an outer portion 5*b*, for interrupting the magnetic circuit. A connection portion 5*f* between each adjacent groove 5*e* connects the inner and outer portions 5*a* and 5*b*.

When electric current is not supplied to the electromagnetic coil 3, the plate spring portion 61*b* holds the armature 5 apart from the friction surface of rotor 4 with a predetermined gap, and the compressor 7 does not operate.

When electric current is supplied to the electromagnetic coil 3, a magnetic force of the coil 3 attracts the armature 5 to the rotor 4 against the spring force of the plate spring portion 61*b*. Thereby, the armature 5 is coupled to the rotor 4, and the compressor 7 operates.

An operation of the elastic member 63 while the armature 5 is coupled to the rotor 4 will be explained based on FIG. 13. Solid lines in FIG. 13 denote locations of each element 5, 61 and 63 when the clutch 1 is disengaged, and two dotted chain lines denote locations thereof when the clutch 1 is engaged. When the clutch 1 is engaged, the deformation amount of the plate spring portion 61*b* is large at the outer area thereof, since the outer area is far from the rivet connection point, and is small at the inner area thereof abutting the rivet connection point. Thus, the inner area of the elastic member 63 is largely pulled by the armature 5.

According to the example in FIG. 13, the thickness of the outer area of elastic member 63 changes from t1 to t1' (t1 is nearly equal to t1'), and the thickness of the inner area of elastic member 63 changes from t2 to t2' (t2 to t2' ). In this example, t2 is 3.0 mm and t2' is 3.5mm, thus the deformation amount, 0.5 mm, is substantially the same as a gap between the armature 5 and the rotor 4.

If the thickness of the inner area of elastic member 63 is same as the thickness of the outer area, the ratio (t2' −t2)/t2 is large and the distortion of elastic member 63 is large. That is, the spring modulus of the elastic member 63 increases, thereby increasing the necessary to cause the rotor 4 to couple with the armature 5.

However, in the third embodiment, the inner area thickness t2 is set larger than the outer area thickness t1. Thus the ratio (t2' −t2)/t2 is small, thereby decreasing the spring modulus of elastic member 63.

As described above, although the plate spring portion 61*b* is a simple disc facing the armature 5, the clutch 1 operates efficiently.

Further, in the third embodiment, the elastic member 63 is attached to the entire surface of the armature 5, thus the elastic member 63 supports all of the armature 5. Therefore, vibrations of the armature 5 are efficiently reduced, thereby further reducing the clutch operation noise.

Additionally, the construction in the third embodiment is better than that in the first embodiment for the following reason. In the first embodiment, the grooves 61*c*, 61*d* and 61*e* extending completely through the spring plate member 61, are formed for providing arm-shaped plate spring portions 61*b*. Thus, when the elastic member 63 is formed from liquified rubber material, the rubber material leaks through the grooves 61*c*, 61*d* and 61*e*.

To prevent the rubber material from leaking, each of grooves 61*c*, 61*d* and 61*e* need be firmly sealed to a mold. However, it is difficult to make the spring plate member 61 completely flat. Therefore, it is difficult to seal the grooves 61*c*, 61*d* and 61*e* to the mold, and the liquified rubber material tends to leak.

However, in the third embodiment, the plate spring member 61*b* is a complete dish, so that the grooves 61*c*, 61*d* and 61*e* are not formed. Thus the melted rubber material does not leak. As a result, the elastic member 63 is efficiently provided, thereby reducing a cost for producing the hub 6.

(Fourth Embodiment)

In the fourth embodiment, as shown in FIG. 14, the thickness of the elastic member 63 changes step-wise a radial intermediate part 63d thereof. Here, the outer thickness t1 of elastic member 63 is smaller than the inner thickness t2 thereof.

(Fifth Embodiment)

In the fifth embodiment, as shown in FIG. 15, the thickness of armature 5 gradually decreases from the outer area through the inner area thereof. The thickness of the elastic member 63 gradually increases from the outer area through the inner area thereof.

(Sixth Embodiment)

In the sixth embodiment, as shown in FIG. 16, the thickness of inner ring 5a is larger than that of outer ring 5b. The inner area thickness t2 of the elastic member 63 is larger than the outer area thickness t1 thereof.

(Seventh Embodiment)

In the seventh embodiment, as shown in FIGS. 17 and 18, the thickness of elastic member 63 is constant from the inner area through the outer area thereof. The plate spring portion 61b has a plurality of circumferential oval holes 61m, for example four oval holes 61m, to reduce the spring modulus of elastic member 63.

The elastic member 63 is not attached where the oval holes 61m are formed. Thus a binding force against an elastic deformation of the elastic material 63 becomes small. As a result, though the thickness of elastic member 63 is constant from the inner area through the outer area, the inner area of elastic member 63 easily deforms elastically, thereby preventing the spring modulus of elastic member 63 from increasing.

(Eighth Embodiment)

In the eighth embodiment, as shown in FIG. 19, thin film type elastic covers 63e and 63f cover the outer and inner periphery surfaces of armature 5 respectively. The thickness of the cover 63e and 63f is, for example, 0.3 through 0.5 mm. A special coating process to preserve the surface of armature 5 can be eliminated by providing the covers 63e and 63f. In the eighth embodiment, a saucer type spring is used as the plate spring portion 61b. Alternatively, as in the first and second embodiments, an arm-like plate spring may be used as the plate spring member 61b.

What is claimed is:

1. An electromagnetic clutch comprising:

an electromagnetic coil;

a rotor;

an armature selectively coupled to said rotor when said electromagnetic coil is energized;

a hub coupled to said armature;

a spring plate member coupled to said hub, said spring plate member including:

an arm-like plate spring portion structured to generate a resilient force to separate said armature from said rotor when said electromagnetic coil is not energized, an outer ring portion integrated with said plate spring portion, said outer ring portion facing said armature; and a stopper structured to push said armature toward said rotor; and an elastic member provided between said armature and said outer ring portion configured to connect said armature directly with said outer ring portion.

2. An electromagnetic clutch according to claim 1, wherein said elastic member is formed into a ring-like plate.

3. An electromagnetic clutch comprising:

an electromagnetic coil;

a rotor;

an armature selectively coupled to said rotor when said electromagnetic coil is energized;

a hub coupled to said armature, said hub including an inner hub structured for connection with a rotation shaft to which said hub is adapted for connection thereto;

a spring plate member coupled to said hub, said spring plate member including an arm-like plate spring portion structured to generate a resilient force to separate said armature from said rotor when said electromagnetic coil is not energized, and an outer ring portion integrated with said plate spring portion, said outer ring portion facing said armature; and an elastic member provided between said armature and said outer ring portion structured to connect said armature directly with said outer ring portion;

wherein said spring plate member is connected to said inner hub at an inner area thereof.

4. An electromagnetic clutch according to claim 3, wherein said spring plate member further includes a stopper structured to position said hub relative to a rotation shaft to which said hub is adapted to be connected.

5. An electromagnetic clutch comprising:

an electromagnetic coil;

a rotor;

an armature selectively coupled to said rotor when said electromagnetic coil is energized;

a hub coupled to said armature;

a spring plate member coupled to said hub, said spring plate member including a saucer-like plate spring portion structured to generate a resilient force to separate said armature from said rotor when said electromagnetic coil is not energized; and an elastic member provided between said armature and said saucer-like plate spring portion structured to connect said armature directly with said saucer-like plate spring portion;

wherein a thickness of an inner area of said elastic member is larger than a thickness of an outer area thereof.

6. An electromagnetic clutch according to claim 5, wherein said saucer-like plate spring portion includes a hole at an inner area thereof so that said elastic member elastically deforms easily.

7. An electromagnetic clutch comprising:

an electromagnetic coil;

a rotor;

an armature selectively coupled to said rotor when said electromagnetic coil is energized;

a hub coupled to said armature;

a spring plate member coupled to said hub, said spring plate member including a saucer-like plate spring portion structured to generate a resilient force to separate said armature from said rotor when said electromagnetic coil is not energized; and an elastic member provided between said armature and said saucer-like plate spring portion structured to connect said armature directly with said saucer-like plate spring portion, said elastic member including thin film-like covers structured to cover outer and inner periphery surfaces of said armature.

8. An electromagnetic clutch according to claim 7, wherein said saucer-like plate spring portion includes a hole at an inner area thereof so that said elastic member elastically deforms easily.

* * * * *